C. B. SCHOENMEHL.
BATTERY ELECTRODE SUPPORT.
APPLICATION FILED JUNE 10, 1908. RENEWED APR. 6, 1909.

922,730.

Patented May 25, 1909.
2 SHEETS—SHEET 1.

WITNESSES
Ernst P. Wold
Ruth Raymond

INVENTOR
Charles B. Schoenmehl
BY
Chamberlain & Newman
ATTORNEYS

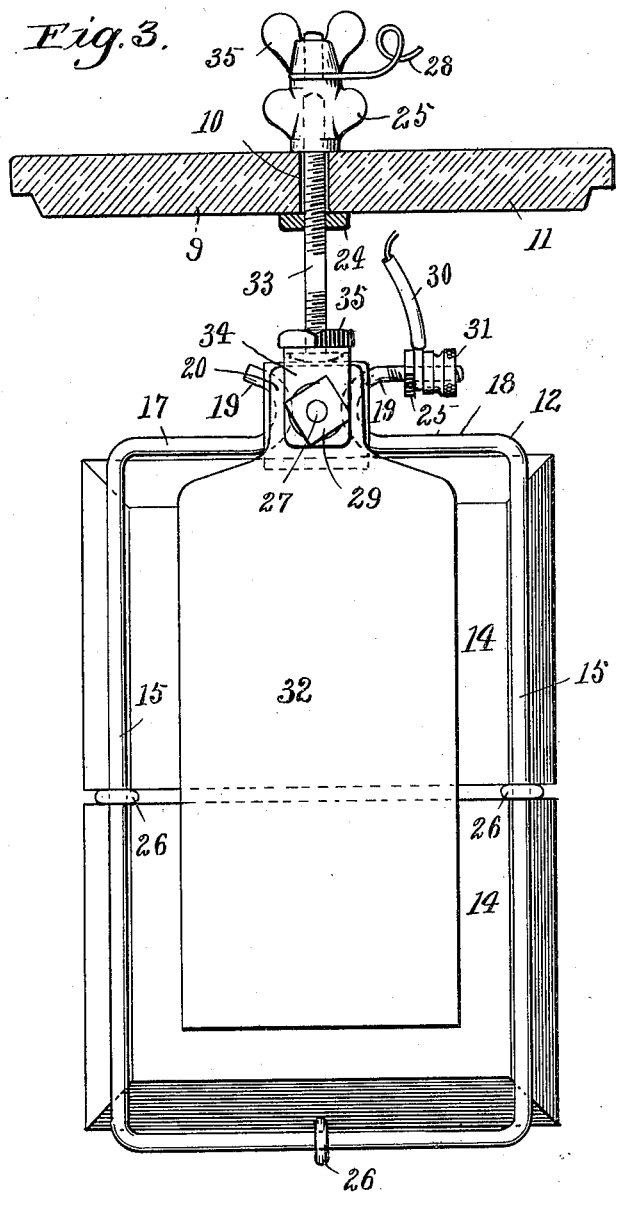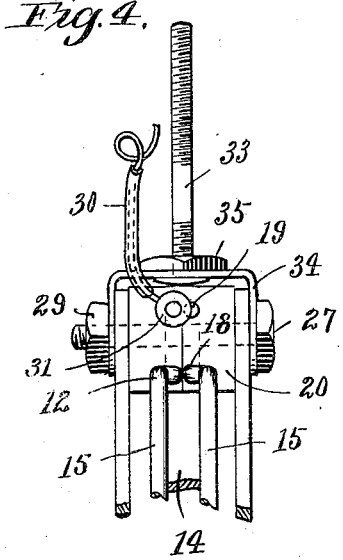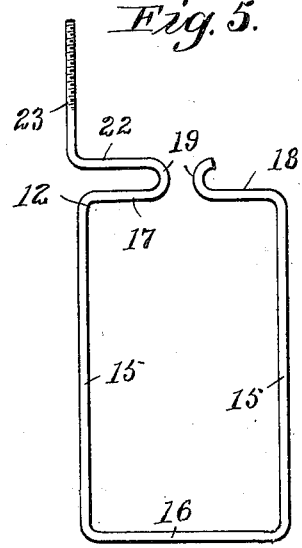

UNITED STATES PATENT OFFICE.

CHARLES B. SCHOENMEHL, OF WATERBURY, CONNECTICUT.

BATTERY-ELECTRODE SUPPORT.

No. 922,730.   Specification of Letters Patent.   Patented May 25, 1909.

Application filed June 10, 1908, Serial No. 437,615. Renewed April 6, 1909. Serial No. 488,294.

*To all whom it may concern:*

Be it known that I, CHARLES B. SCHOEN-MEHL, a citizen of the United States, and resident of Waterbury, in the county of New Haven and State of Connecticut, have invented certain new and useful Improvements in Battery-Electrode Supports, of which the following is a specification.

This invention refers to electrode supports or holders for primary batteries and especially to means for suspending plate forms of electrodes and it particularly relates to wire electrode supports of the class shown in my former patent #848,559 and is an improvement thereon.

It is the purpose of the invention to provide a simple and inexpensive wire form of electrode support which will readily fit on the several forms of three hole covers now upon the market, and to which support both positive and negative electrodes may be insulatively secured and suspended together side by side from a single supporting frame; to design the frame so that the electrode plates may be quickly and conveniently attached thereto.

This holder may or may not be used the second time as desired, but is constructed inexpensively with a view of using it but once, and throwing it away after the plates have run out. The negative plates however when formed of oxid of copper are usually saved, broken up, ground, reoxidized, pressed and baked and thus used again.

Figure 1:
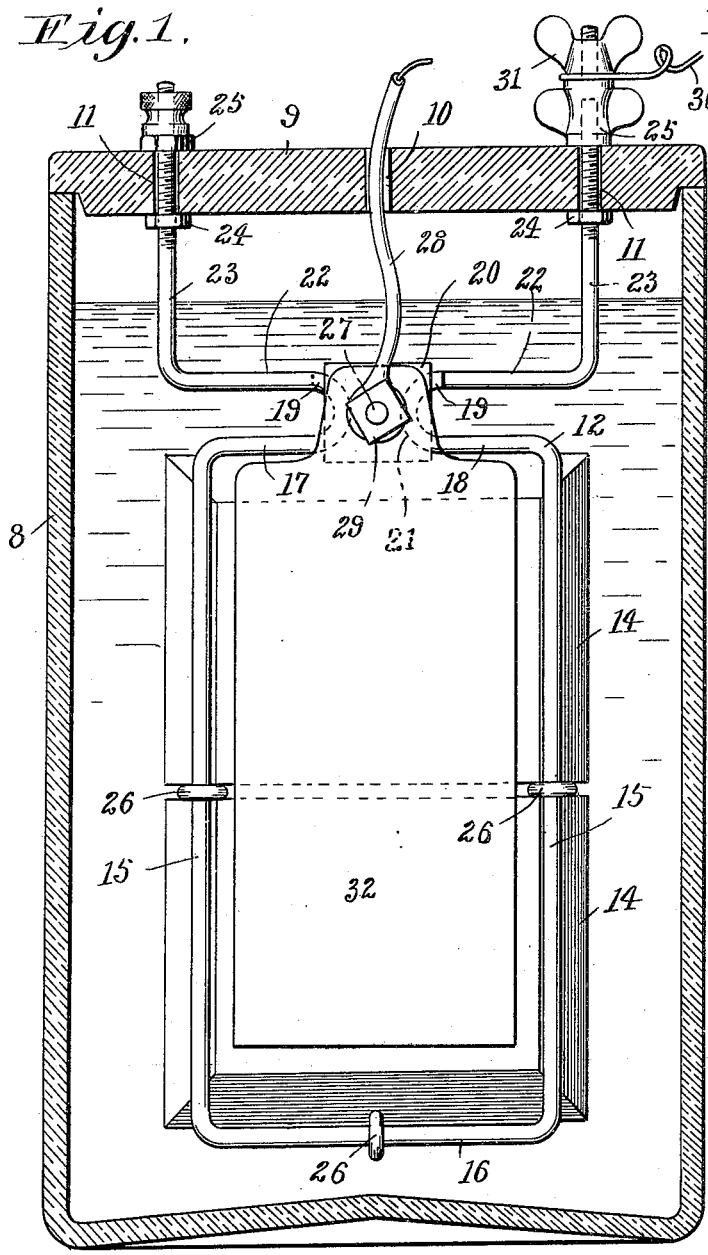
Figure 2:
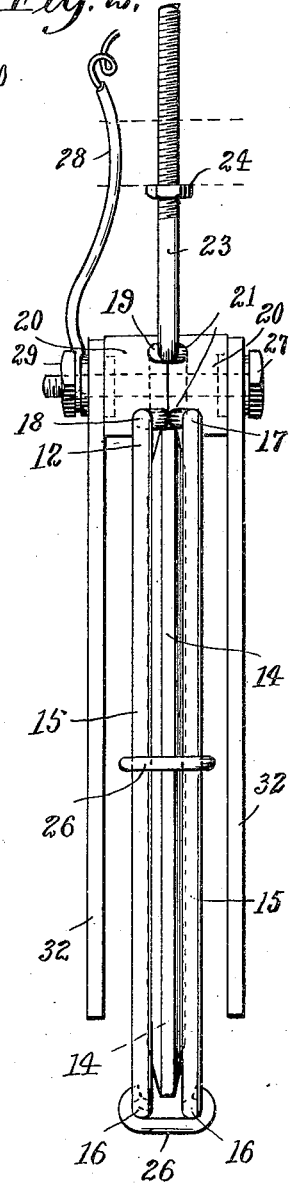

Upon the accompanying drawings forming a part of this specification similar characters of reference denote like or corresponding parts throughout the several figures and of which, Figure 1, shows a front side elevation of my mproved wire support, suspended within a battery jar shown in section, and having both the positive and negative electrodes, contained therein. Fig. 2, is a side edge view of the support and electrodes shown in Fig. 1. Fig. 3, is a front side elevation of a slightly modified form of support, with electrodes mounted therein and having an attached suspending connection. Fig. 4, is a side edge of the construction shown in Fig. 3, but partly broken away, and Fig. 5, shows a separate or detached side view of one of the wire side frames as employed in Figs. 1 and 2.

In detail 8 represents a battery jar and 9 a cover having a central hole 10 and end side holes 11 through which the support is attached. The supporting frame is formed of two special shaped wire frames 12 which are alike in construction and each formed of a single piece of wire. They are bent to form a general rectangular shaped one to engage each side face of the negative plate electrodes 14 of which there are preferably two in number though more or less may be used or of different sizes. In Fig. 5, I have shown a detail of one of these side members of the support as contained in the construction shown in Figs. 1 and 2, which comprises two vertical side members 15, a bottom portion 16 and two inwardly disposed top portions 17 and 18, which are curled up as at 19 to form broad bearings for insulating blocks 20—20 attached to the front and rear sides. The side members 15 are so spaced as to engage the side portions of the faces of the oxid plate while the top and bottom portions are a little below and above the top and bottom edges of said plates. These blocks are each provided with suitable grooves 21 on the inner faces to receive the end portions 19 of both the front and back side frame as shown. The curled up end of one side portion 17 is extended and returned as at 22 with the end 23 carried up as shown in Figs. 1 and 2. Said end being threaded and provided with nuts 24 and 25 for attachment to a cover. Each of the front and back frames is preferably provided with one such suspending end, and when the two wire frames are assembled as shown, they form a hanger at each side, as seen in Fig. 1, and at a proper distance apart to enter the holes in covers such as have heretofore been used for the attachment of circular zincs. The two wire side frames are held against the plates by open links 26 of which there may be any desired number. The top portion of the said frames are held together intermediate the two porcelain blocks 20 which are clamped by the bolt 27 passing therethrough. Said bolt also serves for the attachment of the zinc electrodes 32 suspended from the blocks and at either side of the negative electrode as indicated in Figs. 2 and 4. As shown in Figs. 1 and 2 the field wire 28 is attached to the said bolt and against the zinc plates by a nut 29 thus connecting with both zinc electrodes. The said wire when attached in this way is carried up through the central hole 10 in the covers and serves as the connection to one side of the battery while the other connection 30 is made with the nut 31 and through the wire 23.

The side frames 12 employed in the construction shown in Figs. 3 and 4 differ from those shown in the other figures in that they have no extended portion 23, the wire ends terminating with the formation of the portions 19 and the threading of the one end for the attachment of the binding nuts 25 and 31. This modification also includes an attached suspending bolt 33 whereby the device may be connected or detached by the manipulation of a single nut 25 as in the other forms. To the lower head end of the bolt is connected a yoke 34, the ends of which are turned down at right angles to fit against the sides of the zinc plates 32 and are provided with holes through which the bolt 27 is threaded, thus forming a connection with the elements whereby they can be suspended. In this form the field wire 28 would be connected through the bolt 33 by nuts 25 and 35.

Having thus described my invention what I claim and desire to secure by Letters Patent is:—

1. In a battery the combination of an oxid plate, a support therefor formed of wire and adapted to engage the opposite sides of said plate and having its end portions disposed over the top of the plate, blocks arranged against the sides of said end portions, and means for securing said blocks and end portions together.

2. An electrode support for a battery comprising two rectangular shaped wire frames to engage the opposite faces of an electrode, each said frame having an extension with means for attachment to a cover and means for securing the two frames against the electrode.

3. An electrode support for batteries comprising two rectangular shaped frames for engaging the opposite faces of the electrode having their inwardly disposed adjoining ends turned upward above the electrode, means for suspending the said support from the battery cover.

4. An electrode support for batteries comprising two rectangular shaped frames for engaging the opposite faces of the electrode having their inwardly disposed adjoining end portions deflected upward, means for insulatingly connecting positive electrodes to the said upwardly disposed portion of the frame.

5. An electrode support for batteries comprising two rectangularly shaped wire frames to engage the opposite faces of the electrode, means for holding the said frames against the electrode when placed therebetween, insulating blocks secured to the upper portion of the said wire frames and zinc electrodes suspended from the said blocks on either side of the negative electrodes.

6. An electrode support for a battery comprising two rectangularly shaped wire frames of a like construction with means for securing the same against an electrode and each having a portion disposed outward and upward to engage the opposite side portions of a cover.

7. An electrode support for a battery comprising two suitably shaped wire frames to engage the opposite side faces of an electrode, each frame having an upwardly disposed central portion at its top side, an insulating block engaging the said upwardly disposed portions of the frame and means for securing positive electrodes to the said block and at either side of the said frame.

8. In a battery, the combination with a copper oxid plate or plates, a support comprising two wire frames to engage the opposite sides of the plate or plates and having their end portions disposed inward toward each other over the top of the plate, and a bolt located between said end portions to clamp the same and frames against the sides of the plates.

9. In a battery, the combination with a copper oxid plate or plates, a support comprising two wire frames to engage the opposite faces of the plate or plates having their end portions disposed inward toward each other over the top of the plate, a bolt located between said end portions to clamp the same and frames against the sides of the plate, and means for insulatingly attaching zinc electrodes to the opposite sides of said frame and plates.

Signed at Bridgeport, in the county of Fairfield, and State of Connecticut this 1st day of June, A. D., 1908.

CHARLES B. SCHOENMEHL.

Witnesses:
C. M. NEWMAN,
RUTH RAYMOND.